(12) United States Patent
Ryoo

(10) Patent No.: US 7,596,383 B2
(45) Date of Patent: Sep. 29, 2009

(54) METHOD FOR UPDATING A LOCATION OF A MOBILE COMMUNICATION TERMINAL

(75) Inventor: Bong-Suk Ryoo, Seoul (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 11/370,037

(22) Filed: Mar. 8, 2006

(65) Prior Publication Data
US 2006/0205429 A1    Sep. 14, 2006

(30) Foreign Application Priority Data
Mar. 9, 2005    (KR) .................... 10-2005-0019767

(51) Int. Cl.
*H04B 7/00* (2006.01)
(52) U.S. Cl. ................. 455/519; 455/404.2; 455/456.1; 455/518
(58) Field of Classification Search ............. 455/404.2, 455/456.1–456.3, 518–521
See application file for complete search history.

(56) References Cited

U.S. PATENT DOCUMENTS

| | | | |
|---|---|---|---|
| 6,564,049 B1 | 5/2003 | Dailey | |
| 2003/0154243 A1* | 8/2003 | Crockett et al. | ............. 709/203 |
| 2005/0282579 A1 | 12/2005 | Kim | |
| 2006/0142006 A1 | 6/2006 | Ryoo | |

FOREIGN PATENT DOCUMENTS

| | | |
|---|---|---|
| EP | 1677560 | 7/2006 |
| JP | 10-308970 A | 11/1998 |
| WO | 00 69185 | 11/2000 |
| WO | 03/069943 | 8/2003 |

OTHER PUBLICATIONS

OMA Open Mobile Alliance: "Push to talk over celllular (PoC)—Architecture Draft Version 1.0 Open Mobile Alliance OMA-AD_PoC-V1-0-20041117-D", Internet Citation, Nov. 17, 2004, URL:http://member.openmobilealliance.org/ftp/public_documents/POC/Permanent_documents/>.
"Universal Mobile Telecommunications System (UMTS)", ETSI Standards Institute, Sophia-Antipo, FR vol. 3-SA2, No. V600, Dec. 2004.
English language Abstract of JP 10-308970 A (Nov. 17. 1998).

* cited by examiner

*Primary Examiner*—Raymond S Dean
(74) *Attorney, Agent, or Firm*—Birch, Stewart, Kolasch & Birch, LLP

(57) ABSTRACT

A method for updating a location of a terminal having a PTT function which includes, when the terminal moves into a new communication system coverage area, initiating a data call and transmitting a communication system identifier to a base station if the PTT function of the terminal is enabled, after initiating the data call, determining whether the terminal is registered in a PTT server, and upon determining that the terminal is registered in the PTT server, releasing the data call.

4 Claims, 4 Drawing Sheets

METHOD FOR UPDATING A LOCATION OF A MOBILE COMMUNICATION TERMINAL

This application claims the benefit of Korean Application No. 10-2005-19767, filed on Mar. 9, 2005, which is hereby incorporated by reference in its entirety

BACKGROUND OF THE INVENTION

1. Field of the Invention

The present invention relates to a mobile terminal having a push to talk (PTT) function, and more particularly to a method for updating a location of a mobile terminal having a PTT function with a low amount of signaling.

2. Description of the Background Art

Conventionally, a mobile terminal (such as a CDMA handset) that has a push to talk (PTT) function (hereinafter, referred to as a PTT terminal) allows communication with another party upon pressing a certain key, similar to a walkie-talkie function. That is, a PTT terminal transmits voice or other audio data when a user presses a PTT key, and may receive voice or other audio data while in a standby mode after releasing the PTT key.

A PTT terminal performs one-to-one or one-to-many communications, and operates in a half-duplex mode. A PTT terminal may transmit voice data in the form of packets, using a CDMA or GSM network, for example. The packets may be transmitted to their destination by using Voice over Internet Protocol (VoIP), for example.

FIG. 1 illustrates a related art process for registering a system identification (SID) when a PTT terminal moves into a new service area, or zone. A SID is an identification number, such as a five-digit number, that identifies a service area, and which is typically broadcast by base stations. Most carriers have one SID assigned to their service area.

According to the related art process illustrated in FIG. 1, when a user turns on the power of a PTT terminal, such as PTT terminals HS1 and HS2, the PTT terminal initiates a data call to a base station, such as base station BTS1, in order to register itself with a PTT server. The PTT terminal subsequently goes into an idle state. HS1, illustrated in FIG. 1, is a PTT terminal that has succeeded in registering with a PTT server, and HS2 is a PTT terminal that has failed to register with a PTT server.

When a PTT terminal moves into an area corresponding to a different SID, such as by moving from SID zone 1 to SID zone 2, or by moving from SID zone 1 into a boundary area where SID zones 1 and 2 overlap, as shown in FIG. 1, the PTT terminal sequentially initiates a zone registration call, a parameter registration call, and a data call to a base station in SID zone 2, such as BTS2, to register a SID change.

A zone registration call is a call originated from a terminal for informing a base station of its location when the terminal moves from one zone to another. A parameter registration call is a call originated from a terminal for informing a base station of a parameter change by the terminal, if a system value changes when the terminal moves from one base station to another. A data call is a call for receiving information required for a PTT service from a base station in an initial connection.

When a PTT terminal initiates a data call to a base station, the data call lasts for a duration of approximately 15 seconds. After the approximate 15 second duration, the base station sends a release message to the PTT terminal to end the data call, and the PTT terminal subsequently enters into an idle state.

Thus, as aforementioned, according to a related art process for registering a SID when a PTT terminal moves into a new service area, when the PTT moves into the new service area, the PTT terminal sends a zone registration message and a parameter change registration message to a base station to register the change of a SID, and then initiates a data call. This frequent messaging increases the load on the mobile communication system, as it requires frequent call channel allocation by a base station, thus preventing the base station from allocating call channels to other mobile terminals.

Further, during the approximate 15 second duration of the data call for registering with the PTT server, incoming calls cannot be received.

SUMMARY OF THE INVENTION

In view of the foregoing, the present invention, through one or more of its various aspects, embodiments, and/or specific features or sub-components, is thus intended to bring out one or more of the advantages as specifically noted below.

An object of the present invention is to reduce the signaling of a mobile communication terminal having a PTT function.

To achieve at least this object, there is provided a method for updating a location of a terminal having a PTT function which includes, when the terminal moves into a new communication system coverage area, initiating a data call and transmitting a communication system identifier to a base station if the PTT function of the terminal is enabled, after initiating the data call, determining whether the terminal is registered in a PTT server, and upon determining that the terminal is registered in the PTT server, releasing the data call.

The communication system identifier may include a SID. The method may include sending a registration message to the PTT server if the PTT function of the terminal is not enabled when the terminal moves into a new communication system coverage area, and entering the terminal into an idle state after sending the registration message to the PTT server.

The method may include, if it is determined that the terminal is not registered in the PTT server, registering the terminal in the PTT server, and upon completion of the registration, releasing the data call. The terminal may determine that is has moved into a new communication system coverage area by comparing a communication system identifier being broadcast by a current communication system with a communication system identifier stored in the terminal. The method may include, upon releasing the data call, storing, in the terminal, a new communication system identifier and an indicator which indicates whether the terminal is registered in the PTT server.

There is also provided a mobile terminal having a PTT function which includes a transceiver that transmits and receives radio communication signals, and a controller that communicates with the transceiver, determines when the mobile terminal moves into a new communication system coverage area, and controls the transceiver to initiate a data call and transmit a communication system identifier to a base station when the terminal moves into a new communication system coverage area if the PTT function of the mobile terminal is enabled.

The transceiver and controller may be configured to receive a data call release message from the base station upon a determination that the mobile terminal is registered in a PTT server. The controller may store in the mobile terminal a new communication system identifier and an indicator which indicates whether the mobile terminal is registered in the PTT server, after receiving the data call release message.

The communication system identifier may include a SID. The controller may control the transceiver to send a registration message to a PTT server if the PTT function of the mobile terminal is not enabled when the mobile terminal moves into a new communication system coverage area, and enter the mobile terminal into an idle state after controlling the transceiver to send the registration message to the PTT server. The mobile terminal may determine that it has moved into a new communication system coverage area by comparing a communication system identifier being broadcast by a current communication system with a communication system identifier stored in the mobile terminal.

There is also provided a computer-readable medium which stores a program for updating a location of a terminal having a PTT function, which includes code for determining when a mobile terminal moves into a new communication system coverage area, and code for initiating a data call and transmitting a communication system identifier to a base station when the terminal moves into a new communication system coverage area if the PTT function of the mobile terminal is enabled.

The program may include code for receiving a data call release message from the base station upon a determination that the mobile terminal is registered in a PTT server. The program may also include code for storing the mobile terminal a new communication system identifier and an indicator which indicates whether the mobile terminal is registered in the PTT server, after receiving the data call release message.

The communication system identifier may include a SID. The program may include code for sending a registration message to a PTT server if the PTT function of the mobile terminal is not enabled when the mobile terminal moves into a new communication system coverage area, and code for entering the mobile terminal into an idle state after the registration message is sent to the PTT server. The code for determining whether the mobile terminal has moved into a new communication system coverage area may include code for comparing a communication system identifier being broadcast by a current communication system with a communication system identifier stored in the mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Described below is a PTT terminal which operates in wireless communication systems, such as, but not limited to, a CDMA system or a GSM system.

The processes disclosed below allow a PTT terminal to register its location with less signaling than that required by related art processes, thus freeing a communicating base station to allocate call channels to other mobile terminals, and freeing the PTT terminal to receive incoming calls.

Figure 1:
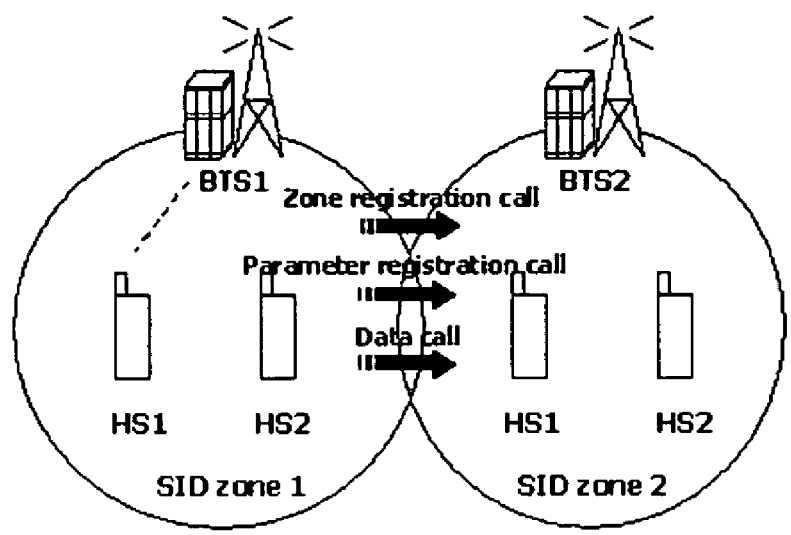
FIG. 1 illustrates a related art process for registering a SID when a PTT terminal moves into a new service area.
Figure 2:
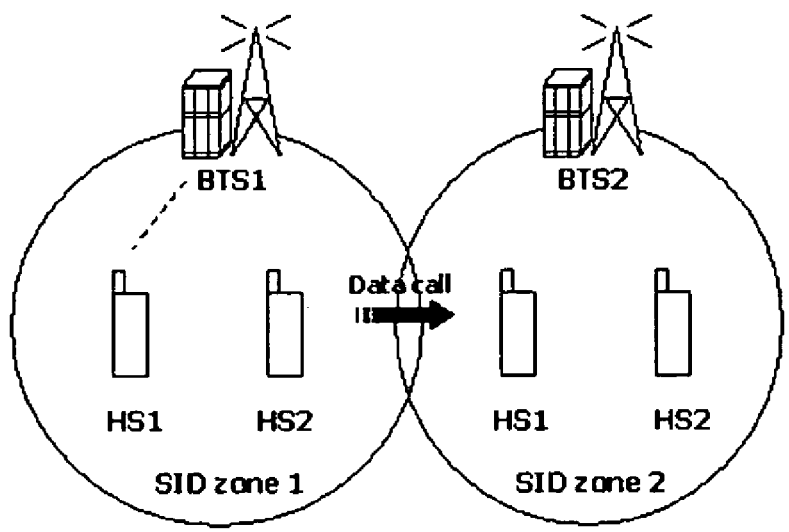
FIG. 2 illustrates a process for updating a location of a PTT terminal according to a disclosed embodiment.

According to a disclosed embodiment illustrated in FIG. 2, when a PTT terminal determines that it has moved within the communication coverage area of a new communication system, the PTT terminal initiates a data call to a PTT server to update its location with the server, but does not transmit a zone registration call or parameter registration call, as performed according to related art registration processes. After the PTT terminal's location has been updated with the server, the data call is then released.

One exemplary method by which the PTT terminal may determine that it has moved within the communication coverage area of a new communication system is by monitoring the communication system identifiers, such as SIDs broadcast by local base stations. If the PTT terminal receives an identifier other than one previously registered in the PTT terminal, for example, it may then determine that it has moved within the coverage area of a system corresponding to the newly received communication system identifier. The PTT terminal may then update its location with the PTT server by providing the PTT server with the identifer of the new communication system.

Figure 3:
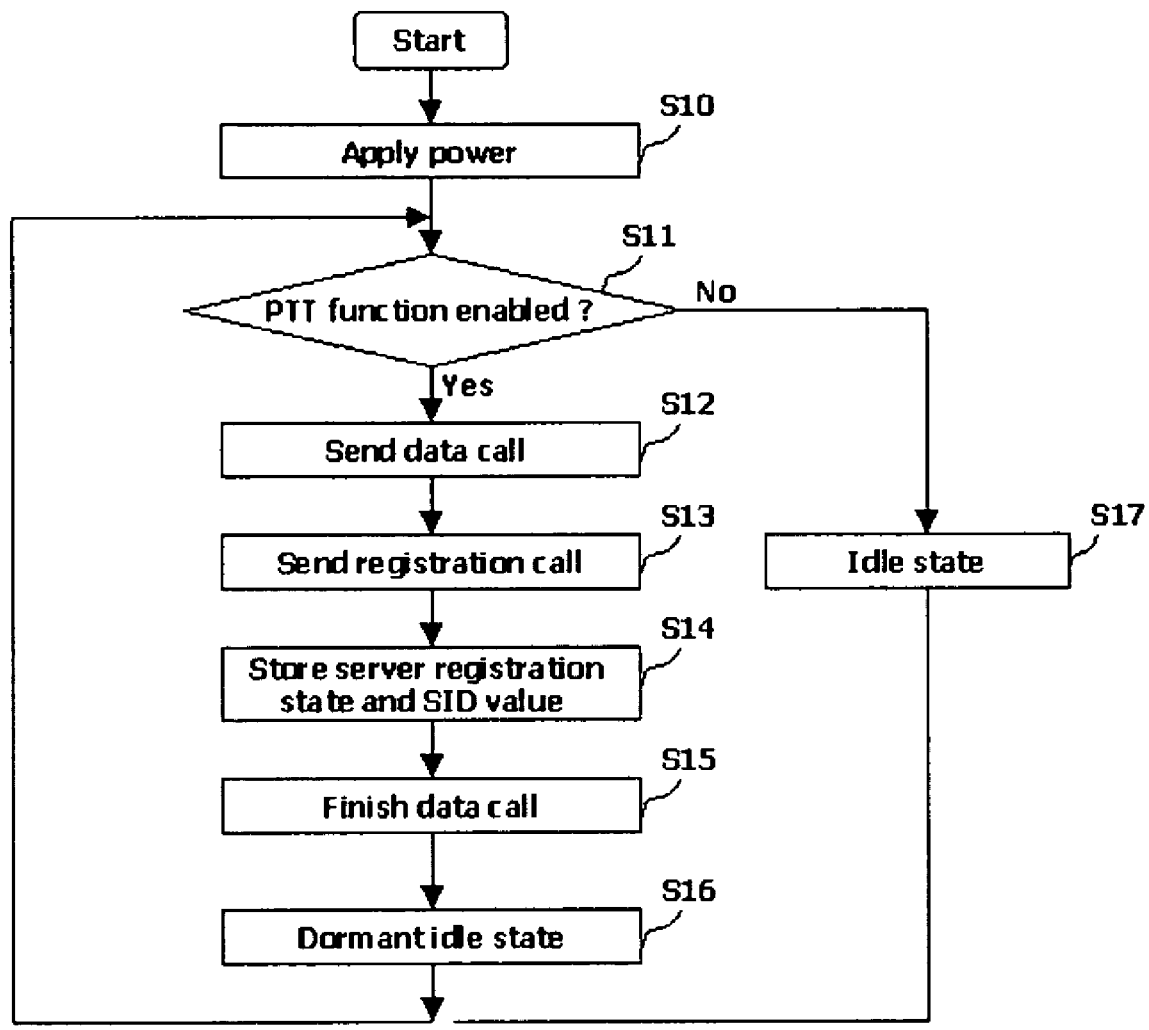
FIG. 3 is a flowchart showing a process for registering a PTT terminal with a server according to a disclosed embodiment.

FIG. 3 is a flowchart showing a process for registering a PTT terminal with a server and a process for storing a SID according to a disclosed embodiment. As shown, after power is turned on (S10), a PTT terminal determines whether a PTT function of the terminal is enabled, such as by checking whether a user has pressed a PTT button (S11). When the PTT terminal determines that the PTT function is enabled, the PTT terminal initiates a data call to a local base station in order to register with a PTT server (S12). However, when the PTT terminal determines that the PTT function is not enabled, the PTT terminal remains in an idle state (S17).

After the PTT terminal has initiated the data call to the base station (S12), the PTT terminal sends a PTT registration message to a PTT server via the data call connection with the base station (S13). The PTT server then sends an acknowledgement message to the PTT terminal if the registration is successful. If the PTT terminal receives an acknowledgement message within a predetermined time limit, the PTT terminal records an indication that the registration was successful; otherwise, the PTT terminal records an indication that the registration was not successful. Further, the PTT terminal also records an identifier that identifies the communication system with which it is communicating, such as, but not limited to, a SID value (S14). The PTT terminal subsequently completes the data call (S15) and enters into an idle state (S16).

Figure 4:
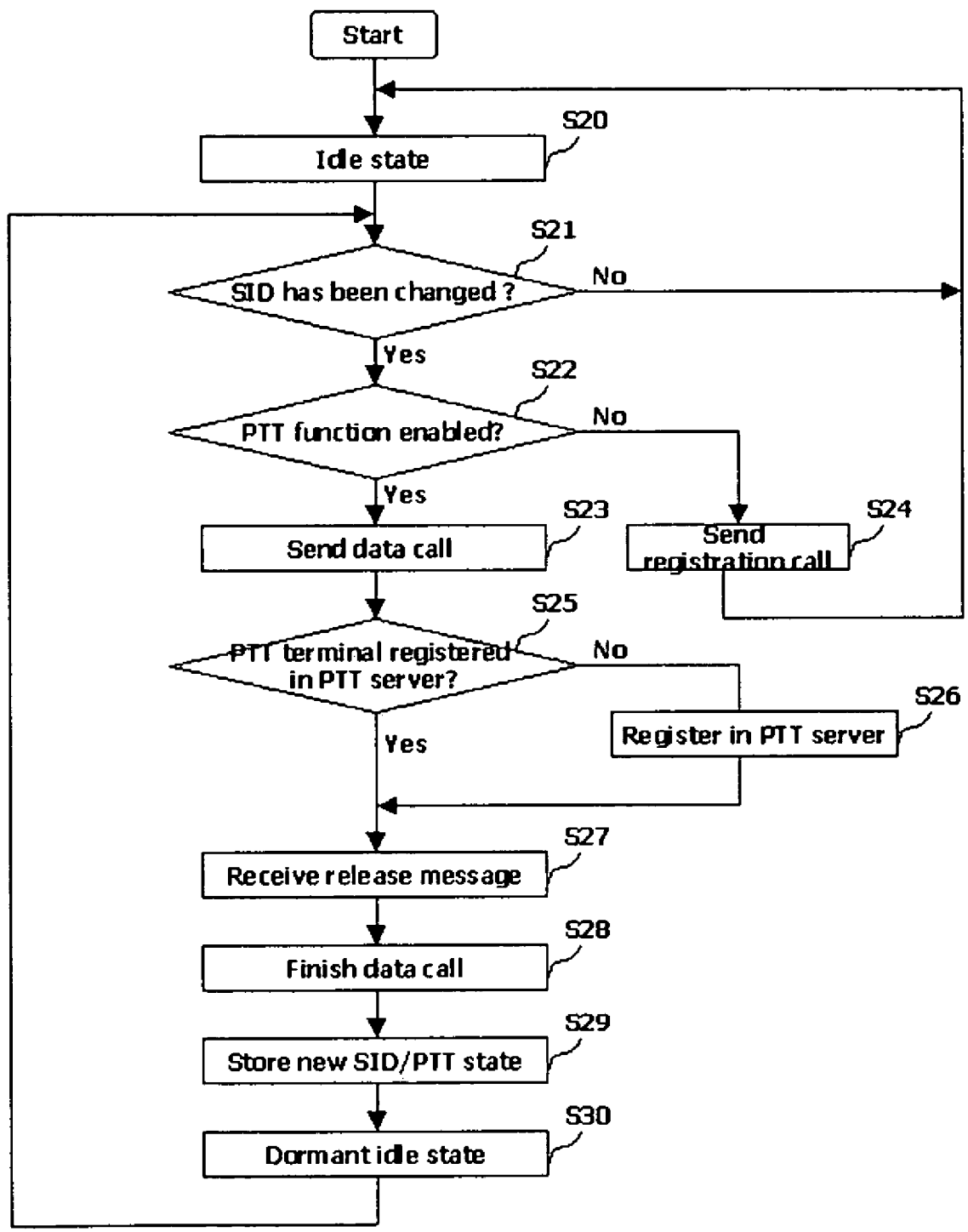
FIG. 4 is a flowchart showing a method for updating a location of a PTT terminal according to a disclosed embodiment.

FIG. 4 is a flowchart showing a process for updating a location of a PTT terminal with a PTT server according to a disclosed embodiment.

As shown in FIG. 4, the process begins with a PTT terminal being in an idle state (S20). The PTT terminal determines whether it has moved into a communication coverage area of a new communication system (S21), such as by monitoring a SID broadcast by a local base station and comparing it to a SID stored in the PTT terminal. When a PTT terminal determines that it has moved into the communication coverage area of a new communication system, the PTT terminal determines whether the PTT function of the terminal is enabled (S22). If the PTT function is not enabled, the PTT terminal initiates a registration call to a PTT terminal to send a zone registration message and a parameter registration message to a PTT server via a base station (S24). However, if the PTT function is enabled, the PTT terminal initiates a data call (S23).

After the PTT terminal initiates the data call, a PTT server determines whether the PTT terminal has been registered in it (S25). If the PTT terminal is registered in the PTT server, the base station sends a release message to the PTT terminal (S27). However, if the PTT terminal has not been registered in the PTT server, the base station maintains the data call for a predetermined period of time (e.g., 20 seconds) while the PTT server registers the PTT terminal (S26), and then the base station sends the release message to the PTT terminal (S27) and ends the data call (S28).

The PTT terminal then records in its memory an identifier that identifies the communication system with which it is communicating, such as, but not limited to, a SID value (S29), and enters into an idle state (S30).

Figure 5:
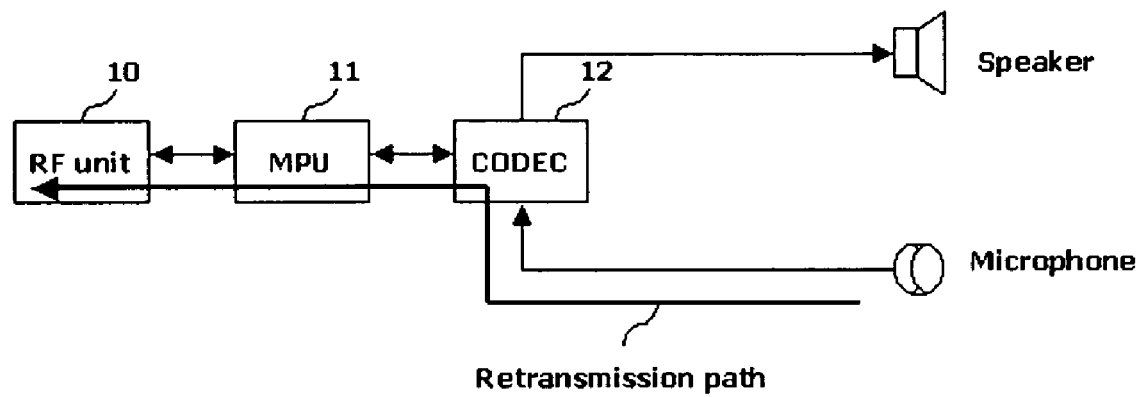
FIG. 5 illustrates a PTT terminal according to a disclosed embodiment.

FIG. 5 is a schematic diagram of an exemplary PTT terminal which can be utilized with the disclosed processes.

As shown in the drawing, the PTT terminal includes a radio frequency (RF) unit 10 that performs radio communications, an MPU (Microprocessor Unit) 11 that performs general control operations, a codec (Coder and Decoder) 12, a speaker and a microphone.

The codec 12 converts an analog audio signal inputted through a microphone into a digital audio signal, which is output to the MPU 11, and converts a digital audio signal received through the MPU 11 into an analog audio signal to be output through the speaker.

A PTT terminal having such construction operates as follows.

First, when a user selects a PTT function, such as by pressing a PTT key, the user can input voice, or other audio, through the microphone of the PTT terminal. The inputted audio signal is converted into a digital signal in the codec 12 to thereby be converted into an appropriate transmission format in the MPU 11.

The RF unit 10 transmits the digital signal converted in the MPU 11 to a local base station, which sends the digital signal to a receiving party PTT terminal. The receiving party PTT terminal processes the transmitted signal to reproduce the voice data of the sender through the speaker of the receiving party PTT terminal.

The PTT terminal utilizes the RF unit 10 and the MPU unit 11 to initiate a data call via a base station, and receive a data call release message from the base station. The PTT terminal can be adapted to operate in one or more various communication systems, such as, but not limited to, a CDMA or GSM system.

As aforementioned, according to the disclosed embodiments, a call origination and a call release time point of a data call are controlled based upon the selection of a PTT function by a user of a PTT terminal and based upon whether the PTT terminal is registered in a PTT server. Thus, the disclosed embodiments reduce the signaling performed by the PTT terminal and the duration of data calls.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

In an embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A method for updating a location of a terminal having a Push-To-Talk (PTT) function, comprising:
   determining that the terminal has moved into a new communication coverage area;
   in response to determining that the terminal has moved into the new communication coverage area, determining whether the PTT function is enabled;
   if the PTT function is not enabled, placing a registration call to a PTT server;
   if the PTT function is enabled, initiating a data call;
   in response to the initiation of the data call, determining whether the terminal is registered in the PTT server; and
   if the terminal is not registered in the PTT server, registering the terminal in the PTT server.

2. The method according to claim 1, wherein determining whether the PTT function is enabled comprises determining whether a user has pressed a PTT button on the terminal.

3. A mobile terminal having a Push-To-Talk (PTT) function, comprising:
   a transceiver that transmits and receives radio communication signals; and
   a controller that communicates with the transceiver, wherein the controller:
       determines when the mobile terminal moves into a new communication system coverage area;
       determines whether the PTT function is enabled, in response to determining that the terminal has moved into the new communication coverage area;
       controls the transceiver to place a registration call to a PTT server, if the controller determines that the PTT function is not enabled; and
       controls the transceiver to initiate a data call, if the controller determines that the PTT function is enabled,
   wherein the data call enables the mobile terminal to be registered in the PTT server, if the mobile terminal has not already been registered in the PTT server.

4. The mobile terminal according to claim 3, wherein the controller determines whether the PTT function is enabled by determining whether a user has pressed a PTT button on the mobile terminal.

* * * * *